UNITED STATES PATENT OFFICE.

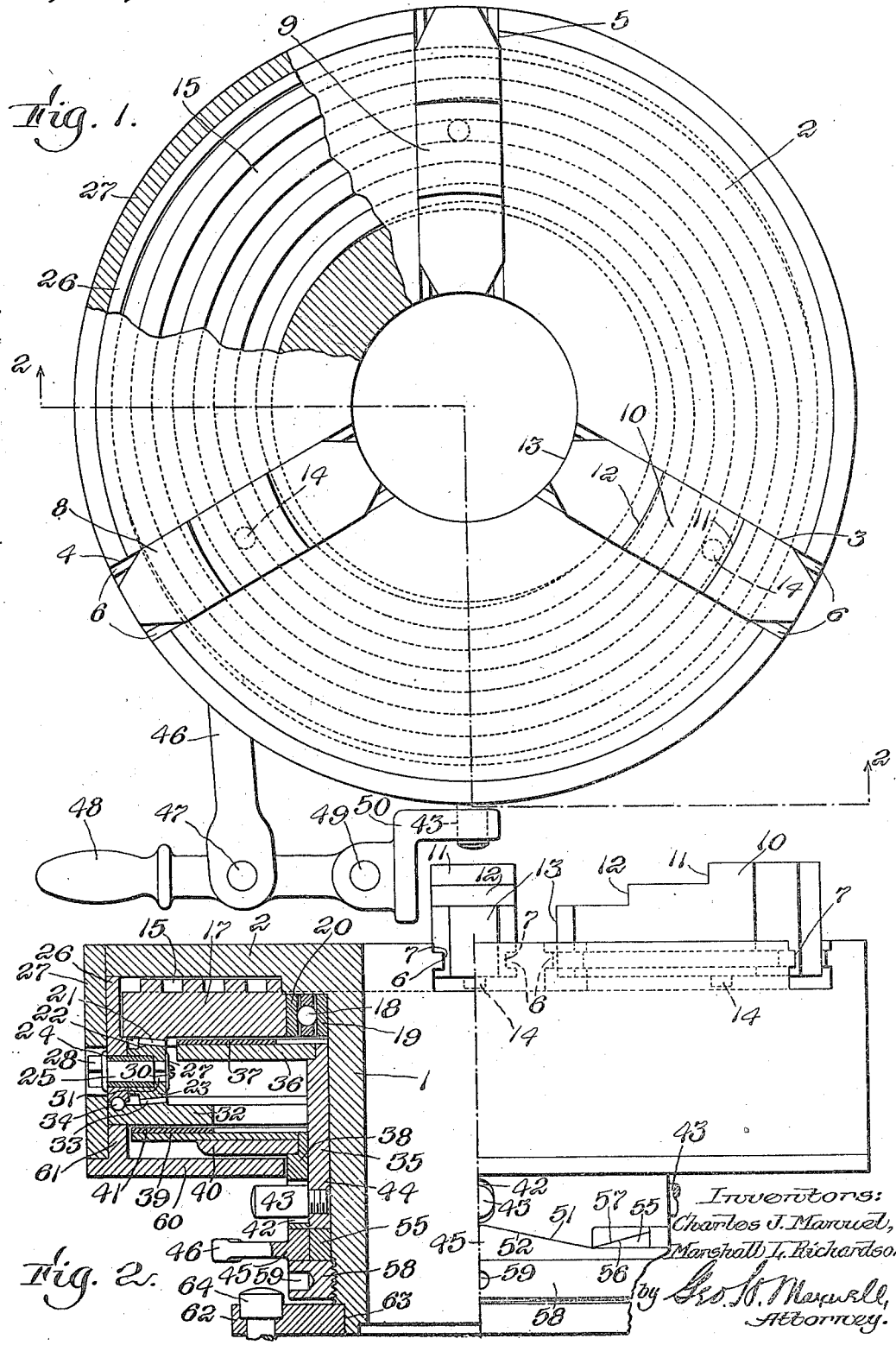

CHARLES J. MANUEL AND MARSHALL L. RICHARDSON, OF WALTHAM, MASSACHUSETTS.

LATHE-CHUCK.

1,238,546.    Specification of Letters Patent.    Patented Aug. 28, 1917.

Application filed November 6, 1916. Serial No. 129,655.

*To all whom it may concern:*

Be it known that we, CHARLES J. MANUEL and MARSHALL L. RICHARDSON, citizens of the United States, and residents of Waltham, in the county of Middlesex and State of Massachusetts, have invented an Improvement in Lathe-Chucks, of which the following description, in connection with the accompanying drawings, is a specification, like letters on the drawings representing like parts.

Our present invention is an improved chuck adapted to hold work of any sort in a lathe, or other machine tool, preferably a rotary tool, for grinding, turning or similar work. The objects of the invention are to provide a simple and improved construction of such a chuck having radial jaws to hold the work, and efficient means to operate said jaws through the rotation of the chuck itself, whereby the radial jaws clamping the work may be moved inwardly or outwardly and maintained firmly in position at any point to which they may be moved. Other objects of the invention are to provide a simple, compact chuck of great strength having its jaw operating mechanism inclosed and protected from injury, dust or the like, as well as eliminating all possibility of injury to the operators of the lathe. In carrying out our invention we prefer to utilize three or more radially slidable gripping jaws which engage the work to be held by the chuck, automatically centering the same and rotating the work so held with the chuck. We also employ a spirally grooved member or scroll to open and close the gripping jaws and actuate said scroll member in either direction at the will of the operator by means of sliding sleeves operated and locked by wedges, which sleeves control the rotation of a gear wheel which actuates the scroll.

Referring to the drawings illustrating a preferred embodiment of the invention, Figure 1 is a front view view of our improved chuck, showing the radial jaws to hold the work and the spiral or scroll member in dotted lines. Fig. 2 is a cross sectional view on the line 2—2 of Fig. 1, showing one half the chuck in cross section and the remaining half in plane view.

It will be appreciated that we may make our improved chuck of any suitable size, diameter or strength, and with the jaws specially formed, if desired, for particular lines of work. Also any desired means of attaching the chuck to a lathe, spindle or other rotary member of a machine, may be employed, the important features of our invention being the method of and means for automatically moving the work-holding jaws inwardly or outwardly and locking them where so moved.

The chuck comprises a principal member having a hub 1 and a flange 2, preferably formed integrally therewith, which flange is provided with a plurality of grooved slides, here shown as three in number, 3, 4 and 5, each slide having grooves or ribs 6, 6, therein, to engage corresponding recesses 7 in the sides of each of the radial jaws 8, 9 and 10. These jaws may have a plurality of gripping faces 11, 12 and 13 as is usual. Each jaw carries on its rearward portion a projecting pin 14, extending through the slide openings in position to engage with the spiral groove 15 formed in the face of a ring 17 immediately back of the flange 2. This scroll member 17 may be mounted to rotate on a ball bearing and raceway as indicated at 18, Fig. 2, which bearing is of usual type and extends entirely around the hub 1, a track 19 being fitted around the hub 1 for the purpose and a hardened bearing ring 20 welded or otherwise secured to the scroll member 17 to constitute this bearing. Rotation of the member 17 and consequently a radial shifting of each jaw 8, 9 and 10 through engagement of the respective pins 14 in the scroll groove, will act to open or close the jaws, as will be readily understood. We prefer to arrange the pins 14 of each slide properly offset to allow for the pitch of the groove and thus keep the jaws concentric with the center of the flange 2. The scroll member 17 carries on its inner side and near its outer periphery, a beveled gear 21 in position to mesh with the gear teeth 22 of an idler 23 mounted on a bushing 24 carried by the stud 25, held in a washer 26, secured to a rim or cover 27 which may be formed integrally with the flange 2 or rigidly secured thereto, and which constitutes a cover for the scroll operating mechanism. To retain the stud 25 and idler 23 in place, we provide a head 28 on one end of the bolt 25 and attach a washer 29 by a screw 30 threaded into the other end 31 of the stud, preferably having the latter square so that the rotation of the idler 23, when the same occurs, will rotate the stud 25 within the bushing 24. Arranged oppositely to the gear 21 on the scroll member 17 is a ring 32 having corresponding gear teeth 33 to mesh with the idler 23 and, preferably, a ball bearing 34 is positioned between the end of the washer 26 and the stud ring 32, grooving raceways therefor, as clearly shown in Fig. 2.

It will be noted that the stud 25 carrying the idler 23, the scroll member 17 and the ring 32, which bears directly against the inner surface of the cover 27, will all be rotated with the hub 1 and flange 2 of the chuck under normal conditions, the radial jaws 8, 9 and 10 being similarly rotated with the said jaws in relative position, determined by the position of their studs 14 in the groove 15. However, if the member 17 is held against rotation while the chuck continues its rotation, the continued movement of the flange 2 carrying the jaws 8, 9 and 10 will automatically move said slides radially of the flange 2, as their respective studs 14 traverse the spiral 15, which is stationary with the member 17, the idler 23 rolling freely around the gear 21 and correspondingly rotating the ring 32. Conversely, if the ring 32 is held against rotation during the continued operation of the chuck, the idler 23 being carried around by the rotating chuck, will tend to rotate the scroll member 17 on the ball bearings 18, thus again moving the jaws 8, 9 and 10 in their respective slideways but in an opposite direction to that previously described. Therefore the sliding jaws can be thus moved either inwardly or outwardly during the limit of their sliding movement afforded by the pitch of the groove 15, as long as the ring 32 or scroll member 17 are thus held from rotation. Furthermore, when the scroll 17 and flange 2 are again rotated together, the jaws will be locked firmly wherever they have thus been adjusted.

In order to hold either the member 17 or the ring 32 from rotative movement for the desired length of time to operate the jaws 8, 9 and 10, we provide devices mounted on sliding sleeves concentric with the hub 1. As shown in the drawings, a sleeve 35 is arranged to slide upon the hub 1, and this sleeve carries at its inner face a friction disk 36, preferably carrying leather or the like friction lining material 37, in position to engage the scroll member 17 when the slide 35 is moved forwardly or toward the flange 2. The second sleeve 38 is also arranged to slide upon the first sleeve 35, which second sleeve carries a friction disk 39 preferably braced by a flange 40 and being lined with friction material 41 around its outer periphery in position to engage the ring 32. Movement of sleeve 35 will detain the scroll member 17 from rotation, permitting the continued rotation of the flange 2 to slide the jaws, while release of the member 17 and the sliding forward of the sleeve 38 holding the ring 32 from rotation will positively rotate the member 17 through the idler 23, thus moving the radial jaws in reverse direction.

In order to effect a sliding movement of the sleeves 35 and 38, we prefer to employ a hand lever operating a pair of wedges. Also the outer sleeve 38 is slotted at a plurality of points, 42, around its periphery, to receive a bolt 43, of less diameter than the length of said slot, which bolt is threaded into a correspondingly tapped recess 44 in the inner sleeve 35. A plurality of these bolts 43 are arranged, and they prevent the normal rotation of either sleeve with the chuck, while permitting the sliding action thereon as above explained. To actuate the sleeves 35 and 38, we provide a wedge member 45, to which is attached a projecting lever 46 having its outer end pivoted at 47 to a hand lever 48 also pivoted at 49 to a bracket 50 secured to any fixed part of the lathe. A swinging movement of the handle 48 inwardly or outwardly will actuate the wedge member 45 to force the slide 38 inwardly, said slide having a beveled face 51 to coöperate with a similar beveled face 52 on said slide. We also prefer to extend one of the studs 43 sufficiently, if necessary, so that the same may engage the bracket 50 or any other fixed part of the lathe, to keep the sleeves 35 and 38 from rotation. A similar wedged member 55 having thereon a beveled face 56 to coöperate with a correspondingly wedged faced member 57 on the lower sleeve 35, effects sliding movement of said sleeve, the slot 42 permitting such relative motion between the two sleeves, as already explained. In order to retain and assemble the said sleeves in position we thread a washer 58 onto a threaded portion of the hub 1, boring spanner holes 59 therein so that the same may be rotated by a wrench. In order to inclose and protect the gear and brake mechanism, as well as to afford a backing and bearing for the ring 32, we apply a cap 60, having its center bored sufficiently to encircle both the sleeves and the hub 1 and with its outer end portion carrying a projecting flange 61 to fit within the rim of the cover 27. This effectually protects the mechanism from dust, dirt and flying particles cut in the lathe, grinder or the like in which the chuck is being used. The entire chuck may be applied to the spindle of a lathe in any desired manner, as by a ring 62 fitted on the reduced end portion 63 of the hub 1 and with bolts 64 fitted therethrough.

Our improved chuck is quickly and instantly operated, being always ready for the attendant to open or close the work-holding jaws through the automatic rotation of the chuck, being instantly released when desired. The friction disks prevent any danger to either the work or the jaws should a careless workman hold the same in position too long or close the jaws more tightly than the work demanded, as the engagement with the ring or scroll member would readily slip at such a time. The entire operating gear for the scroll is compactly inclosed within a substantially dust-proof cover and entirely within the normal limits of the chuck, while a simple, efficient and strong construction is provided therefor.

Our invention is further described and defined in the form of claims as follows:

1. A work holding chuck, having a hub adapted to be rotated by a machine element, a flange on said hub carrying a plurality of work-holding jaws for radial movement relatively with said hub, a scroll member rotatable on said hub and having means connecting each of said jaws thereto, in combination with means for effecting relative rotative movement between said jaws and scroll to slide said jaws radially, including a pair of concentric sleeves, one being slidably mounted on said hub and the other slidably mounted on the first sleeve, means to slide one or both sleeves at will and connections from said sleeves to the scroll member to rotate it in either direction, comprising a lever, a pair of coöperating wedge faces, and a stop on said inner sleeve extending through an elongated slot in said outer sleeve.

2. A work-holding chuck, having a hub adapted to be attached to and rotated by a machine element, a right angle flange thereon, a plurality of jaws adapted to slide radially in the face of said flange, means to actuate all of said jaws simultaneously, comprising a member having a spiral cam path, a friction disk in position to engage said member and effect the sliding movement of all said jaws in one direction, in combination with a second friction disk, a rotatable ring, and a gear, rotatably carried with the chuck and adapted to reverse the direction of rotation of said member, to move the jaws in the opposite direction, a pair of concentric sleeves on said hub, the inner one adapted to slide on said hub and the outer sleeve adapted to slide on said inner sleeve, said sleeves carrying respectively said friction disks, and a pair of wedge members to operate either of said friction disks at will, and means to hold said sleeves where thus moved.

In testimony whereof, we have signed our names to this specification, in the presence of two subscribing witnesses.

CHARLES J. MANUEL.
MARSHALL L. RICHARDSON.

Witnesses to C. J. M.:
  WM. B. POULIN,
  DAVID BARSHELL.
Witnesses to M. L. R.:
  AARON C. WHITE,
  LEO X. SMITH.

Copies of this patent may be obtained for five cents each, by addressing the "Commissioner of Patents, Washington, D. C."